United States Patent [19]

Mulders et al.

[11] 3,907,655
[45] Sept. 23, 1975

[54] PROCESS FOR THE ADDITIVE CHLORINATION OF α-UNSATURATED CARBOXYLIC ACIDS AND ESTERS

[75] Inventors: Julien Mulders, Dworp; Noel Vanlautem, Brussels, both of Belgium

[73] Assignee: Solvay & Cie, Brussels, Belgium

[22] Filed: Oct. 30, 1973

[21] Appl. No.: 411,174

[30] Foreign Application Priority Data

Nov. 10, 1972 Luxembourg............................ 66455

[52] U.S. Cl. ........................... 204/158 HA; 204/158
[51] Int. Cl.² ............................................. B01J 1/10
[58] Field of Search ............................. 204/158 HA

[56] References Cited
UNITED STATES PATENTS

| | | | |
|---|---|---|---|
| 2,865,959 | 12/1958 | Toland.......................... | 204/158 HA |
| 3,401,105 | 9/1968 | Anyos et al................. | 204/158 HA |

Primary Examiner—Howard S. Williams
Attorney, Agent, or Firm—Spencer & Kaye

[57] ABSTRACT

The invention relates to a process for the manufacture of compounds of the general formula

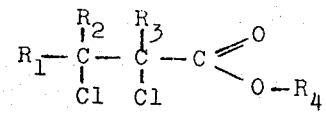

by chlorination in the liquid phase, by means of chlorine, of α-unsaturated compound corresponding to the formula

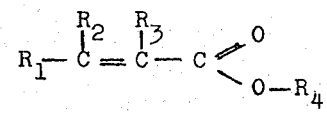

in which $R_1$, $R_2$ and $R_3$ represent a hydrogen atom and/or an alkyl group and/or an aryl group and/or a chlorine or fluorine atom, at least one of $R_1$, $R_2$ and $R_3$ being a hydrogen atom, and in which $R_4$ represents a hydrogen atom or a substituted or unsubstituted alkyl group or an aryl group, said chlorination being carried out in the simultaneous presence of electromagnetic radiation and of a metal compound.

The metal compound will be preferably a compound of a metal of group Va and more particularly a chloride of said metal, especially the antimony pentachloride.

The electromagnetic radiation used is advantageously of a wavelength between 2,000 and 5,000 A.

The process is in particular applicable to the manufacture of 2,3-dichloropropionic and 2,3-dichloro-2-methylpropionic acids and their esters.

15 Claims, 1 Drawing Figure

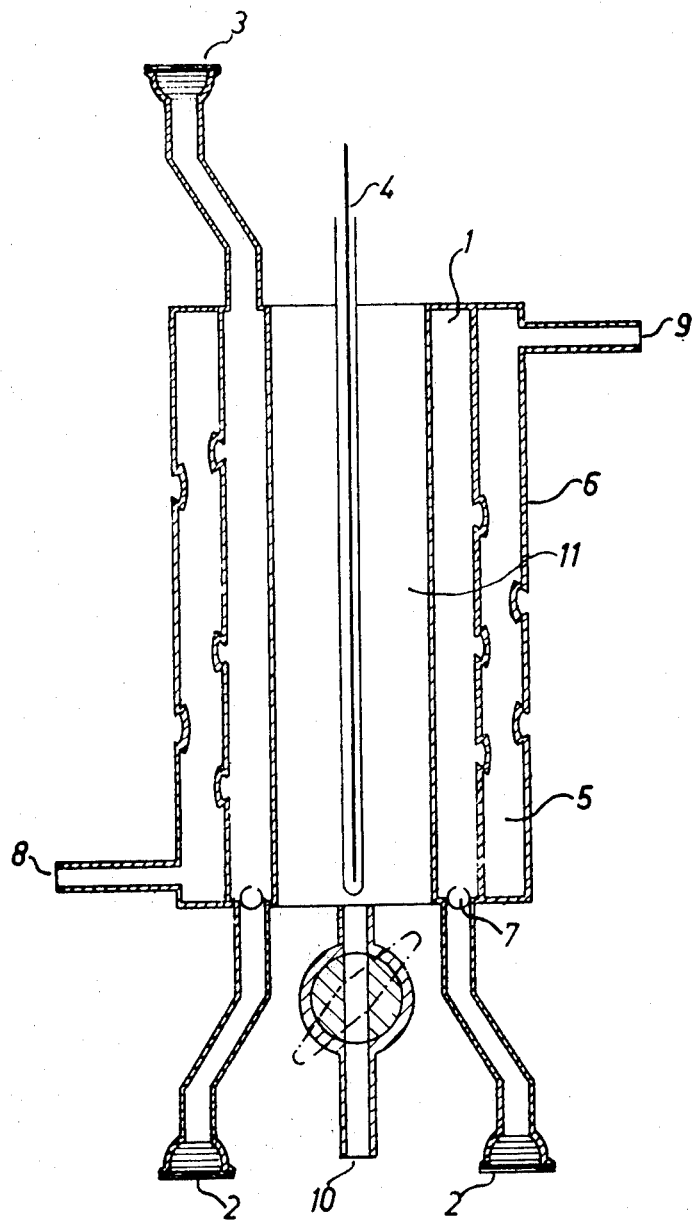

PROCESS FOR THE ADDITIVE CHLORINATION OF <-UNSATURATED CARBOXYLIC ACIDS AND ESTERS

The present invention relates to a process for the manufacture of $\alpha,\beta$-dichlorinated carboxylic acids and esters by additive chlorination of the corresponding $\alpha$-unsaturated acids and esters. The chlorinated compounds obtained according to this process can in particular be used as intermediates for synthesis reactions.

It is known that the addition of one molecule of chlorine to an olefinic compound can take place by a radical mechanism or by an ionic mechanism.

The additive chlorination by the radical mechanism is generally initiated by electromagnetic radiation which causes a scission of the chlorine molecule to give free radicals and gives rise to a chain reaction. However, the addition of chlorine by this mechanism is accompanied by a slower substitution reaction which leads to the formation of a certain amount of undesired more highly chlorinated by-products which are frequently difficult to separate off. Furthermore, in the course of the additive chlorination of certian olefinic compounds - especially those whereof the double bond is conjugated with an electron-attracting functional group (for example acrylic acid and its derivatives-)—the olefinic compounds tend to polymerize under the influence of the electromagnetic radiation.

Turning now to the additive chlorination by the ionic mechanism, this chlorination is favored by the presence of catalysts which affect the chlorine molecule by splitting it heterolytically into $Cl^+$ and $Cl^-$ ions. These specific catalysts for the ionic addition of chlorine to the aliphatic double bonds are, for liquid phase reactions, iodine, iodine chloride, antimony trichloride and pentachloride, aluminium chloride, ferric chloride and, in principle, all chlorides of the elements of groups 4 to 7 of the periodic classification. However, in this case the addition reaction proves to be relatively slow.

The applicant company has found that if the additive chlorination of $\alpha$-unsaturated carboxylic acids and esters in the liquid phase is carried out in the simultaneous presence of electromagnetic radiation and of a metal compound, it is found—completely surprisingly—that a very marked synergistic effect manifests itself, which not only leads to a noticeable increase in the reaction velocity and the chlorination yield but also avoids the various disadvantages mentioned above.

Hence, the present invention concerns a process for the manufacture of compounds of the general formula

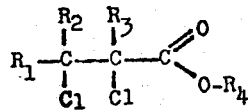

by chlorination in the liquid phase, by means of chlorine, of the $\alpha$-unsaturated compound corresponding to the formula

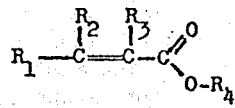

in which $R_1$, $R_2$ and $R_3$ represent a hydrogen atom and/or an alkyl group and/or an aryl group and/or a chlorine or fluorine atom, at least one of $R_1$, $R_2$ and $R_3$ being a hydrogen atom, and in which $R_4$ represents a hydrogen atom or a substituted or unsubstituted alkyl or aryl group, characterized in that the reaction is carried out in the simultaneous presence of an electromagnetic radiation and of a metal compound.

The process according to the invention proves to be particularly advantageous for the manufacture of compounds for which $R_1$ and $R_2$ represent a hydrogen atom and $R_3$ and $R_4$ represent either a hydrogen atom or a methyl or ethyl group.

The process is in particular applicable to the chlorination of acrylic and methacrylic acids and the ethyl and methyl esters of these acids, resulting in the respective formation of 2,3-dichloropropionic and 2,3-dichloro-2-methylpropionic acids and the esters of these acids.

Among the metal compounds it is possible to use the compounds of antimony, bismuth, arsenic, aluminum, tin, titanium, copper, selenium, calcium, zinc, strontium, beryllium, nickel, cobalt, lead, molybdenum, cadmium, silver, magnesium, barium, chromium and the like. More particularly, the compounds of the metals of group Va of the international periodic classification of the elements are used. Among these, the derivatives of arsenic, antimony and bismuth will in particular be used. The antimony derivatives are used preferentially. The metal chlorides will preferably be used as metal compounds, especially the chlorides of the metals of group Va, antimony pentachloride being preferred. The metal chlorides can be replaced by other metal derivatives, especially oxides or bromides. The concentrations of metal compounds to be employed are generally between 0.01 and 100 g/kg of $\alpha$-unsaturated compounds, but larger quantities may nevertheless be appropriate.

The electromagnetic radiation used is advantageously of a wavelength in the ultraviolet and visible region and preferably between 2,000 and 5,000 A.

The reaction takes place in the liquid phase. It is possible to carry out the reaction either in the presence of the pure $\alpha$-unsaturated compound or in a solution in a suitable solvent such as carbon tetrachloride, chloroform, hexachlorobenzene and the like. It is also possible to use, as the solvent, the dichlorinated product formed during the reaction, or any other by-product of the reaction. The solvent must be inert towards chlorine under the reaction conditions. If the reaction is carried out in the presence of a solvent, the concentration of $\alpha$-unsaturated compound in the solution is generally between 1 and 70% by weight of the reaction mixture; other concentrations can however be appropriate.

The reaction temperature is generally between $-50°C$ and the boiling point of the mixture at the working pressure; other temperatures can also be suitable. The reaction pressure can be equal to, below or above atmospheric pressure. Pressures of between 0.5 and 10 atmospheres absolute are particularly suitable.

The reaction can be carried out discontinuously or continuously; in the latter case, the $\alpha$-unsaturated compound (gas or liquid) is introduced continuously into the reactor and a part of the reaction mixture is withdrawn in the liquid state or in the gaseous state if the reaction is carried out at the boiling point of the mixture.

The chlorine can be introduced into the reactor in the gaseous state or optionally in the liquid state. The reactants can optionally be diluted with inert gases (nitrogen, helium and the like).

The molar ratio of α-unsaturated compound to chlorine is preferably between 0.1 and 10.

The process of manufacture according to the invention can be carried out in any type of reactor which is in itself known. A type of reactor which is particularly suitable for such a purpose is shown in FIG. 1.

It consists of a Pyrex sleeve reactor 1 which in its lower part possesses a discharge tap 10 and a ring 7 for distributing gaseous chlorine, perforated with holes of 1 mm diameter and fed with chlorine through the pipelines 2, and, in its upper part, a pipeline 3 for removing the chlorine to a scrubber. A thermocouple 4 is placed in the sleeve reactor 1 and the temperature is controlled by passing thermostated water through the double jacket 5 surrounding the sleeve reactor. This double jacket 5 is provided with an inlet orifice 8 and an outlet orifice 9 for the water and its outer wall 6 is blackened. The lamp 11 is placed at the center of the sleeve reactor.

The examples which follow, which do not limit the invention, illustrate the process and its various advantages.

EXAMPLE 1

This example relates to the chlorination of acrylic acid to give 2,3-dichloropropionic acid.

In a PYREX reactor as described above, chlorine gas is bubbled into the reaction mixture, which consists of 50 g of acrylic acid dissolved in 250 ml of carbon tetrachloride and 0.1 g of hydroquinone. In experiments 1, 3, 4 and 6, 1 g of antimony pentachloride was added. The temperature is maintained at 50°C and the light source is a Philips TLM 20 W/33 RS lamp.

Six experiments on the chlorination of acrylic acid in the presence of $SbCl_5$ and/or of light were carried out under the working conditions defined above. The results of these experiments are shown in the table below.

| Experiment No. | Catalyst | Light | Flow rate of $Cl_2$ mol/hour | Duration of introduction of $Cl_2$, min. | Percentage conversion of acrylic acid into | | |
|---|---|---|---|---|---|---|---|
| | | | | | dichloro compound | trichloro compound | polymer |
| 1 | $SbCl_5$ | without | 0.694 | 60 | 12 | 3 | 0 |
| 2 | none | without | 0.694 | 60 | <1 | <1 | <1 |
| 3 | $SbCl_5$ | without | 0.694 | 200$^{(1)}$ | 74 | 10 | 0 |
| 4 | $SbCl_5$ | with | 0.694 | 60 | 85.5 | 0 | 9.9 |
| 5 | none | with | 0.694 | 60 | 51 | 0 | 49 |
| 6 | $SbCl_5$ | with | 2.776 | 18 | 93 | 2 | 2 |

$^{(1)}$After stopping the introduction of chlorine, the reaction mixture is kept at 50°C until the dissolved chlorine has reacted.

The comparison of experiments 4 and 6 with experiment 1 shows the considerable increase in the reaction velocity resulting from the simultaneous use of light and of $SbCl_5$. Equally, comparison of experiment 6 with experiments 1 and 3 shows that the selectivity has increased. Furthermore, a very marked reduction in the amount of polymer in Examples 4 and 6 compared to Example 5 is observed.

EXAMPLE 2

This example relates to the chlorination of methyl acrylate to give methyl 2,3-dichloropropionate.

A solution of methyl acrylate in carbon tetrachloride, at the rate of 0.27 mol of methyl acrylate per mol of solvent, and chlorine at the rate of 1 mol of chlorine per mol of methyl acrylate, are passed continuously into a Pyrex reactor of the same type as that described above. The dwell time in the reactor is 60 minutes. The temperature is kept at 50°C and the light source is a Philips TLM 40 W/33 RS lamp.

Two experiments were carried out, one in the absence of antimony pentachloride and the other in presence of 0.01 mol of antimony pentachloride per mol of methyl acrylate.

The results of these experiments are shown in the table below.

| Experiment | | 7 | 8 |
|---|---|---|---|
| Catalyst | | none | $SbCl_5$ |
| Light | | with | with |
| Degree of conversion | | 92.2 | 90.5 |
| Yields calculated relative to methyl acrylate converted, % | methyl 2,3-dichloropropionate | 81.8 | 93.9 |
| | methyl 2,2,3-trichloropropionate | 2.1 | 2.3 |
| | methyl 2,3,3-trichloropropionate | 4.2 | 3.8 |
| | polymers | 12.0 | traces |

A marked reduction in the amount of polymers formed is found when light and antimony pentachloride are employed simultaneously.

We claim:

1. Process for the manufacture of a compound of the general formula

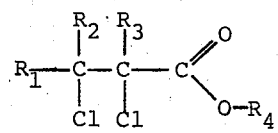

by chlorination in the liquid phase, by chlorine, of an α-unsaturated compound corresponding to the formula

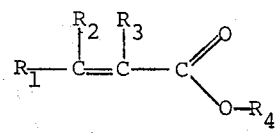

in which $R_1$, $R_2$ and $R_3$ independently represent a hydrogen atom or an alkyl group or an aryl group or a chlorine or fluorine atom, provided that at least one of $R_1$, $R_2$ and $R_3$ is a hydrogen atom, and in which $R_4$ represents a hydrogen atom or a substituted or unsubstituted alkyl or aryl group, comprising reacting the α-unsaturated compound with chlorine in the simultaneous presence of electromagnetic radiation and of a metal compound catalyst.

2. Process according to claim 1 wherein 2,3-dichloropropionic acid is manufactured by chlorination of acrylic acid.

3. Process according to claim 1 wherein 2,3-dichloro-2-methyl-propionic acid is manufactured by chlorination of methacrylic acid.

4. Process according to claim 1 wherein esters of 2,3-dichloropropionic acid are manufactured by chlorination of the corresponding ester of acrylic acid.

5. Process according to claim 1 wherein methyl 2,3-dichloropropionate is manufactured by chlorination of methyl acrylate.

6. Process according to claim 1 wherein esters of 2,3-dichloro-2-methylpropionic acid are manufactured by chlorination of the corresponding ester of methacrylic acid.

7. Process according to claim 1 wherein the metal compound is a compound of a metal of Group Va of the international periodic classification of the elements.

8. Process according to claim 7, wherein the compound of a metal of Group Va is a chloride of a metal of Group Va.

9. Process according to claim 8, wherein the chloride of a metal of Group Va is antimony pentachloride.

10. Process according to claim 1 wherein the electromagnetic radiation has a wavelength of between 2,000 and 5,000 A.

11. Process according to claim 1 wherein the metal compound catalyst is a Lewis acid.

12. Process according to claim 1 wherein the metal compound catalyst is a metal chloride.

13. Process according to claim 1 wherein the metal compound catalyst is a metal compound of arsenic, antimony or bismuth.

14. Process according to claim 1 wherein the metal compound catalyst is a metal oxide or metal bromide.

15. Process according to claim 1 wherein the metal compound catalyst is a compound of antimony, bismuth, arsenic, aluminum, tin, titanium, copper, selenium, calcium, zinc, strontium, beryllium, nickel, cobalt, lead, molybdenum, cadmium, silver, magnesium, barium, or chromium.

* * * * *

UNITED STATES PATENT OFFICE
CERTIFICATE OF CORRECTION

PATENT NO. : 3,907,655
DATED : September 23rd, 1975
INVENTOR(S) : Julien Mulders et al It is certified that error appears in the above-identified patent and that said Letters Patent are hereby corrected as shown below:

Column 1, line 2, change "<-UNSATURATED" to --α-UNSATURATED--.

Column 4, line 8, after "in" insert --the--.

Signed and Sealed this sixteenth Day of December 1975

[SEAL]

Attest:

RUTH C. MASON
*Attesting Officer*

C. MARSHALL DANN
*Commissioner of Patents and Trademarks*